No. 763,388.

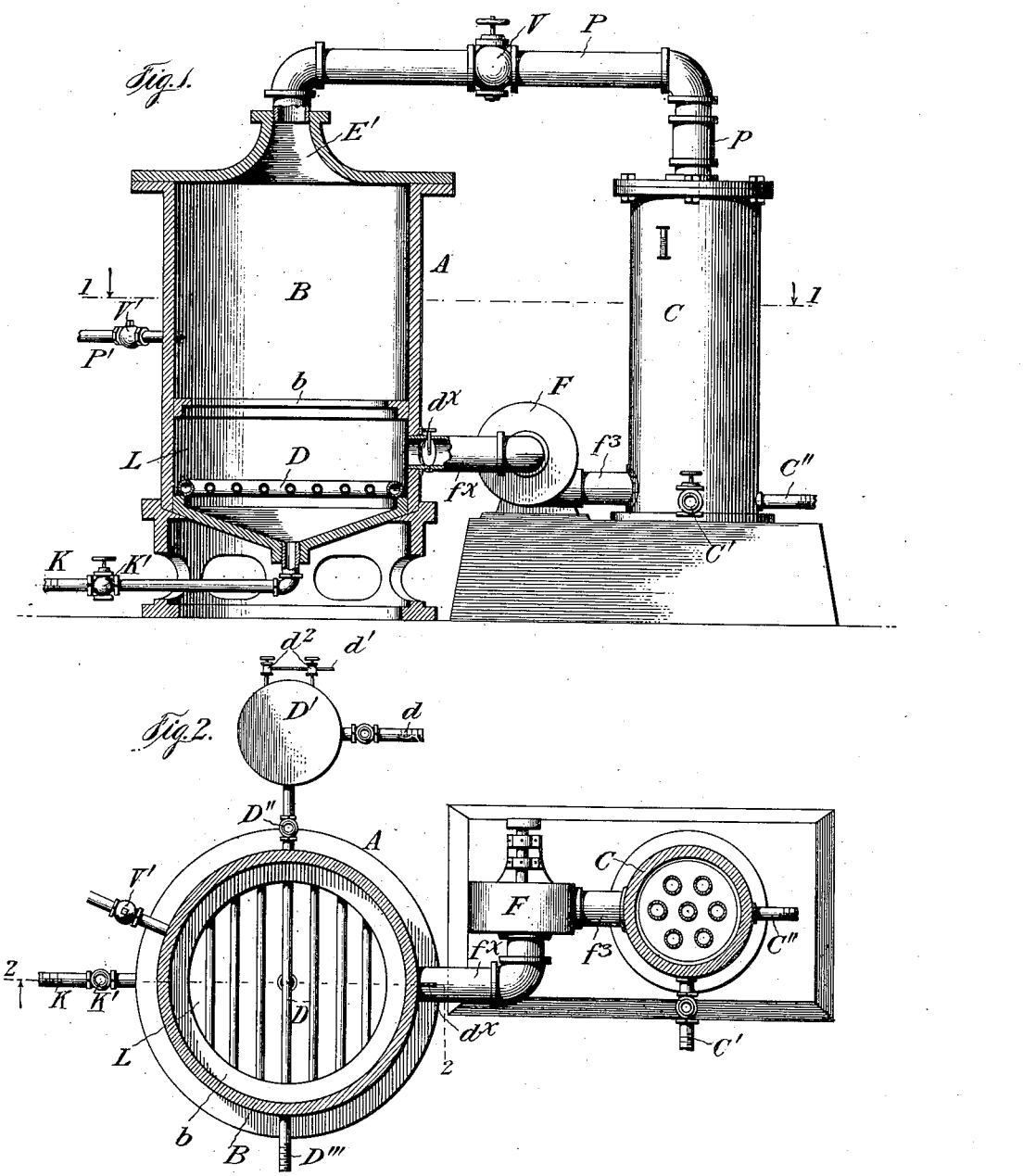

Patented June 28, 1904.

UNITED STATES PATENT OFFICE.

LOUIS GATHMANN, OF WASHINGTON, DISTRICT OF COLUMBIA, ASSIGNOR OF ONE-FOURTH TO ELDRED P. DICKINSON AND SOMERSET R. WATERS, OF WASHINGTON, DISTRICT OF COLUMBIA.

METHOD OF DRYING SUBSTANCES.

SPECIFICATION forming part of Letters Patent No. 763,388, dated June 28, 1904.

Application filed January 22, 1904. Serial No. 190,224. (No specimens.)

*To all whom it may concern:*

Be it known that I, LOUIS GATHMANN, a citizen of the United States, residing at Washington, in the District of Columbia, have invented a certain new and useful Method of Drying Vegetable, Mineral, Animal, and Compound Substances, of which the following is a full, clear, and exact specification.

This invention has relation to the art of drying substances or materials in general, whether organic or inorganic, of natural or artificial derivation. In this art it has been common to make use of a closed circuit comprising, generally speaking, a drying-chamber, means to heat the air in the circuit to vaporizing temperature, means to cause the air to circulate in the circuit, and thereby vaporize the moisture in the substance or material contained in the drying-chamber, and a condenser to condense the vapors as they are evolved from the substance or material to be dried or substantially dried. In the drying of more or less bulky materials liable to be injuriously affected when subjected *ab initio* to a vaporizing temperature and with a view to heat them through and through before being subjected to a vaporizing heat and at the same time prevent surface drying it has been proposed to start the operation by first producing a vapor-laden atmosphere at a temperature below the boiling-point of water by causing the air in a closed circuit to absorb more or less steam while in circulation in said circuit and before it enters the drying-chamber, the moisture-laden atmosphere being then gradually heated while in circulation to a vaporizing temperature, the circulation being kept up until the material to be dried has been heated through and through and has acquired the same temperature as the moisture-laden atmosphere and until the latter has become saturated by additional vapor evolved from the material being dried. When this point has been reached, the saturated air has been blown out of the circuit and fresh ambient air taken in, the operation being repeated until the material has been freed of its moisture and the moisture blown off.

It is obvious that in a method of drying such as last above referred to there is not only a great amount of heat lost by blowing it out of the circuit from time to time and reheating the ambient air taken in, so that a substantially saturated atmosphere at a vaporizing temperature cannot be constantly maintained in the circuit, while whenever ambient air is taken in the temperature of the vapor-laden atmosphere which may remain in the circuit, as well as the material to be dried, becomes chilled, and condensation throughout the circuit is liable to result, necessitating the revaporization of the condensate and the reheating of the material to the desired degree and abnormally prolonging the operation of drying.

In those processes which are based upon the circulation of the drying medium in a closed circuit and the condensing of the vapors no means have been provided to produce a vapor laden atmosphere in the drying-chamber.

Now my invention has for its object the combination of the two methods described so improved that the loss of heat is minimized and the condensation of the vapors is regulated relatively to the heat required to restore the lost heat to the circulating medium, so as to maintain a sufficiently vapor-saturated atmosphere in the drying-chamber nearly to the ending of the operation of drying or until the vapors evolved from the substance or material to be dried become insufficient to saturate the air. I may produce the vapor-laden atmosphere in the drying-chamber by heating the substance or material and the air therein until sufficient vapor has been evolved from said substance or material to be dried, then cause the vapor-laden atmosphere to circulate in the circuit until it is saturated, lower the temperature of the saturated air to a condensing temperature after it leaves the drying-chamber, and restore the lost heat before it again enters the drying-chamber and so regulate the condensation relatively to the heat supplied as to cause the atmosphere to leave the drying-chamber in a saturated condition until near the end of the operation or until the vapors evolved from the material to be dried are insufficient to saturate the atmosphere, when said vapors may be condensed as fast as evolved until the material is thoroughly dried.

Instead of producing saturation of the air by circulation I may effect this in the drying-chamber by means of vapor evolved from the substance or material to be dried and then establish the circulation and proceed with the condensation as above set forth, or I may produce the initial vapor-laden atmosphere by admitting vapor, as steam, to the drying-chamber, then heat the vapor-laden atmosphere to a vaporizing temperature, establish the circulation, and then proceed with the condensation as above set forth.

The various modes of procedure described will depend upon the substance or material to be dried—as, for instance, upon the percentage of moisture contained in such substance or material or the bulk thereof, or both, and also upon the physical character of the substance or material.

By the described process I am not only enabled to greatly expedite the operation of drying, but also to prevent surface drying before the substance or material is heated through and through to a vaporizing temperature, while the loss of heat is minimized. On the other hand, in drying substances or compounds containing vaporizable constituents the boiling-points of which differ I can recover these constituents separately by suitably regulating the vaporization and condensation, or, in other words, by vaporizing these constituents in the order of their boiling-points and condensing them in an inverse order.

Any suitably-organized apparatus may be used in carrying out my invention, and a convenient form of such apparatus is illustrated in the accompanying drawings, in which—

Figure 1 is an elevation, partly in section, on line 2 2 of Fig. 2, which latter is a horizontal section on line 1 1 of Fig. 1.

A indicates the drying apparatus; B, the drying-chamber, having an annular ledge $b$ for the support, for instance, of a foraminous basket or partition (not shown) for the substance or material to be dried, and P' indicates a pipe controlled by valve V' and connected to the drying-chamber B and to a source of steam-supply (not shown) for supplying steam to said drying-chamber, the bottom of the chamber being conical and having a discharge-pipe K, controlled by a valve K', and above said bottom is arranged a heater-condenser D. The lower part L of the drying-chamber below the ledge $b$ and above the heater-condenser is connected to the intake $f^x$ of the casing F of a fan-blower, whose discharge $f^3$ is connected to the lower end of the heating-space of a heater C of any suitable construction—as, for instance, a tubular heater whose tubes are supplied with a heating medium, as steam, through pipe connection C', such steam being exhausted through pipe C'', which may be a return-pipe to the boiler. (Not shown.) The heating-space of the heater C is connected at its upper end by a pipe P to the upper head for the drying-chamber, said pipe being provided with a valve V for controlling the flow of fluid to the drying-chamber B and for cutting said chamber out of the circuit, as it is obvious that when, for instance, a basket charged with material to be dried is supported from the ledge $b$ said basket forms a bottom for the drying-chamber, while the lower part L of said drying-chamber becomes a heating-chamber, which latter may also be cut out of the circuit by a valve or damper $d^x$ in the intake $f^x$ of the fan-blower casing.

For the purpose of controlling the supply of heating or cooling medium to the heater-condenser D, I provide a separate vessel D', connected to said heater-condenser by a pipe provided with a valve D''. The fluid to be heated or the cooling agent is supplied to vessel D' through valve-controlled pipe $d$, and said vessel D' is provided with burners, (not shown,) to which a suitable fuel, liquid or gaseous, is supplied through pipe $d'$, having suitable burner branches $d^2$. I am thus enabled to supply a heating medium to the heater-condenser D to regulate the temperature thereof or to supply a cooling medium to said heater-condenser of any desired or required low temperature for condensing purposes, the heating or cooling agent being exhausted through pipe D''', which may be a return-pipe to vessel D'.

In practice and for the purpose of affording access to the drying-chamber the pipe P, that connects the head E' to the heater C, is pivotally connected to the latter at $p$, so that said pipe may be rotated and the head E' swung off the drier A, while when the apparatus is in use said head is bolted fluid-tight to said drier.

The operation is dependent upon the character of the substance to be dried. For instance, if the substance is dense and contains but little vaporizable matter the drying and heating condensing-chambers B and L are cut out of the circuit by closing valves V', K', and $d^x$. A heating agent is supplied to heater-condenser D to gradually heat the material to be dried until evaporation of the vaporizable constituents of the material to be dried begins, and this is continued until the atmosphere in the drying-chamber becomes laden with vapor. Heat is now supplied to heater C, the valves V and $d^x$ are opened, and the fan set in motion, whereby the vapor-laden atmosphere is caused to circulate through the material in chamber B until it becomes saturated, whereby the material to be dried becomes heated through and through, surface-drying being thus avoided and vaporization takes place from the interior of the material.

The temperature of the heating medium supplied to heater-condenser may now be reduced to an extent sufficient to condense some of the vapors, the lost heat being restored to the vaporous atmosphere as it flows through heater C, whereby it is maintained at a vaporizing temperature, the operation being continued until the greater part of the moisture has been removed from the material to be dried or until the vapors evolved therefrom are insufficient to maintain the atmosphere saturated therewith, when a cooling agent is supplied to heater-condenser and the condensation of the vapors effected as fast or substantially as fast as they are evolved from the material to be dried. If, on the other hand, the substance to be dried contains a large proportion of vaporizable matter, the saturated atmosphere may be produced in the drying-chamber by cutting it out of the circuit and supplying the necessary heat to heater-condenser D and then proceeding as above set forth. It is obvious that by either mode of procedure the condensate discharged through pipe K can be recovered; but should the material contain vaporizable constituents of different boiling-points—as, for instance, alcohol and ether, generally used in the manufacture of high explosives—then I so regulate the temperature of the heater-condenser and the heat supplied by heater C as to vaporize these constituents in the order of their boiling-points and condense them in a reverse order, the ether being first vaporized and condensed and then the alcohol, if the recovery thereof separately is desired. On the other hand, if the material to be dried is bulky or of comparatively high density I produce a vaporous or vapor-laden atmosphere in the drying-chamber by the admission of steam thereto through pipe P' while said chamber is cut out of the circuit and establish the circulation, heat being supplied to both heater C and heater-condenser D, the temperature of the circulating medium being gradually raised to a vaporizing temperature to heat the material through and through and prevent surface drying, and when saturation of the circulating medium has been reached I begin condensation, as above set forth.

Having thus described my invention, what I claim as new therein, and desire to secure by Letters Patent, is—

1. The method of drying, which consists in first forming a vaporous atmosphere in a space containing the substance or material to be dried, then causing said atmosphere to continuously flow from said space through a second space and back to the first-named space, heating the atmosphere, while in circulation, to a vaporizing temperature, then reducing the temperature of the atmosphere during its passage through said second space, restoring the lost heat and regulating the condensation to maintain the atmosphere in a vaporous condition until the substance or material to be dried has been freed from a portion of its vaporizable matter, then condensing the vapors, and effecting these operations under exclusion of ambient air, for the purposes set forth.

2. The method of drying, which consists in first forming a vapor-saturated atmosphere in a space containing the substance or material to be dried, then causing said atmosphere to continuously flow from said space through a second space and back to the first-named space, reducing the temperature of the atmosphere during its passage through said second space to a condensing temperature, restoring the lost heat to the atmosphere after it has left said second space, regulating the condensation to maintain the atmosphere in a vaporous condition until the substance or material to be dried has been freed from a portion of its vaporizable matter, then condensing the vapors and effecting these operations under exclusion of ambient air, for the purpose set forth.

3. The method of drying materials containing volatilizable constituents whose boiling-points differ and are lower than the boiling-point of water, which consists in subjecting such materials in a closed circuit to the action of a drying medium containing aqueous vapor, vaporizing said constituents at one point of the circuit in the order of their boiling-points, condensing the vapors in the inverse order of their boiling-points at another point of the circuit to obtain fractional distillates, and maintaining a constant circulation of the medium in said circuit until those constituents the boiling-points of which are lower than that of water have been removed from the material, and finally condensing the aqueous vapor, for the purposes set forth.

4. The process of drying substances containing vaporizable constituents the boiling-points of which differ, which consists in producing a vapor-laden atmosphere in a drying-chamber containing the substance to be dried and forming part of a closed circuit, by vaporizing that constituent having the lowest boiling-point, causing the vapor-laden atmosphere to circulate through the drying-chamber until it is saturated with said vapor, then condensing the same, maintaining the circulation and continuing the operation until the constituent having the lowest boiling-point has been removed from the substance, then raising the temperature of the circulating medium to vaporize the constituent having the next higher boiling-point and proceeding as before until this has been removed, and so on for each constituent in the order of their boiling-points, substantially as set forth.

5. Producing a vapor-laden atmosphere in a drying-chamber forming part of a closed circuit while said chamber is cut out of said circuit, including the chamber in the circuit, causing the vapor-laden atmosphere to continuously circulate through the drying-chamber, heating the same while in circulation and regulating the heat to produce a vapor-saturated atmosphere, gradually condensing the vapor after the saturated atmosphere has moved out of contact with the material to be dried, restoring the lost heat to said atmosphere, and continuing the operation until the vaporizable matter has been eliminated or substantially eliminated from the material to be dried, substantially as set forth.

6. The method of drying materials containing vaporizable constituents the boiling-points of which differ, which consists in causing a drying medium to continuously flow from a space containing the substance or material, through a second space and back to said first space, reducing the temperature of said drying medium to a condensing temperature during its passage through said second space, restoring the lost heat to said drying medium after it has left said second space, regulating the vaporizing temperatures of the drying medium to vaporize the vaporizable constituents in the material to be dried in the order of their boiling-points and regulating the condensing temperatures of said drying medium to condense the said vaporizable constituents in the inverse order of their boiling-points and conducting these operations under exclusion of ambient air, for the purposes set forth.

In testimony that I claim the foregoing as my invention I have signed my name in presence of two subscribing witnesses.

LOUIS GATHMANN.

Witnesses:
HENRY ORTH, Jr.,
WILLIAM O. RAY.